(12) United States Patent
Jeon et al.

(10) Patent No.: US 11,511,612 B2
(45) Date of Patent: Nov. 29, 2022

(54) VEHICLE BODY WITH BATTERY CONNECTED THERETO

(71) Applicants: HYUNDAI MOTOR COMPANY, Seoul (KR); KIA MOTORS CORPORATION, Seoul (KR)

(72) Inventors: Chang Un Jeon, Hwaseong-si (KR); Jang Ho Seo, Daejeon (KR); Seung Tae Song, Suwon-si (KR); Tae Hyuck Kim, Asan-si (KR); Chan Young Kang, Gunpo-si (KR); Hae Kyu Lim, Bucheon-si (KR); Ji Woong Jung, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 134 days.

(21) Appl. No.: 17/179,849

(22) Filed: Feb. 19, 2021

(65) Prior Publication Data
US 2022/0063388 A1 Mar. 3, 2022

(30) Foreign Application Priority Data
Aug. 25, 2020 (KR) .......................... 10-2020-0107329

(51) Int. Cl.
*B60J 7/00* (2006.01)
*B60K 1/04* (2019.01)
(Continued)

(52) U.S. Cl.
CPC ............... *B60K 1/04* (2013.01); *B62D 21/03* (2013.01); *B62D 27/065* (2013.01); *B60K 2001/0438* (2013.01)

(58) Field of Classification Search
CPC .......... Y02E 60/10; Y02E 60/50; Y02P 70/50; H01M 50/20; H01M 50/411; H01M 50/417; Y02T 10/62
See application file for complete search history.

(56) References Cited

U.S. PATENT DOCUMENTS 6,328,604 B1 * 12/2001 Inoue .................. H01M 50/598
439/522
RE44,994 E 7/2014 Rawlinson et al.
(Continued)

FOREIGN PATENT DOCUMENTS

KR 1998-0075030 A 11/1998

*Primary Examiner* — Kiran B Patel
(74) *Attorney, Agent, or Firm* — McDonnell Boehnen Hulbert & Berghoff LLP

(57) ABSTRACT

Disclosed herein is a vehicle body with a battery connected thereto including a lower panel of a vehicle which extends in a horizontal direction, and to which a battery case in which a battery is provided in an upper portion or a lower portion is coupled, a seat cross member configured to extend in a direction parallel to a transverse direction of the vehicle and located on an upper surface or a lower surface of the lower panel, a battery cross member provided in the battery case, configured to extend in the direction parallel to the transverse direction of the vehicle, and located to correspond to the seat cross member in a vertical direction of the vehicle, and a coupling device configured to simultaneously pass through to couple the lower panel, the seat cross member, and the battery cross member in the vertical direction of the vehicle.

8 Claims, 7 Drawing Sheets

(51) Int. Cl.
  *B62D 27/06*    (2006.01)
  *B62D 21/03*    (2006.01)

(56) References Cited

U.S. PATENT DOCUMENTS

| | | | | |
|---|---|---|---|---|
| 11,136,069 | B2* | 10/2021 | Ahn | B62D 25/24 |
| 11,400,986 | B2* | 8/2022 | Jeong | B62D 25/04 |
| 2019/0210659 | A1* | 7/2019 | Choi | B62D 25/025 |
| 2020/0324827 | A1* | 10/2020 | Ahn | B60K 1/04 |
| 2021/0179193 | A1* | 6/2021 | Kim | B60L 50/64 |
| 2021/0394605 | A1* | 12/2021 | Kim | H01M 50/298 |
| 2022/0063391 | A1* | 3/2022 | Kim | H01M 50/204 |
| 2022/0072943 | A1* | 3/2022 | Kim | H01M 10/6556 |
| 2022/0080857 | A1* | 3/2022 | Kim | H01M 50/583 |
| 2022/0144060 | A1* | 5/2022 | Shin | H01M 50/249 |
| 2022/0161855 | A1* | 5/2022 | Tatsuwaki | B62D 25/20 |
| 2022/0190430 | A1* | 6/2022 | Oh | H01M 50/249 |
| 2022/0219523 | A1* | 7/2022 | Shin | H01M 50/242 |

* cited by examiner

TOP VIEW

VEHICLE BODY WITH BATTERY CONNECTED THERETO

CROSS REFERENCE TO RELATED APPLICATIONS

The present application claims priority of Korean Patent Application No. 10-2020-0107329 filed on Aug. 25, 2020, the entire contents of which is incorporated herein for all purposes by this reference.

BACKGROUND

Field of the Disclosure

The present disclosure relates to a vehicle body with a battery connected thereto, and more particularly, to a vehicle body with a battery connected thereto, which is formed to connect a lower panel, a battery case, and a seat cross member.

Description of the Related Art

Generally, vehicles are divided into internal combustion engine vehicles, solar-powered vehicles, and electric vehicles according to energy sources.

The internal combustion engine vehicle uses fuel such as gasoline or diesel, suctions a mixture of the fuel and air into an interior of an engine, and burns the mixture to generate a driving force, thereby allowing the internal combustion engine vehicle to travel.

In addition, the solar-powered vehicle absorbs solar energy and converts the solar energy into electrical energy to drive a motor, thereby allowing the solar-powered vehicle to travel.

In addition, the electric vehicle rotates an electric motor using electric energy such as a battery and the like to drive a wheel, thereby allowing the electric vehicle to travel.

In the electric vehicle, a battery assembly used as a power source is disposed on a bottom surface of the vehicle, and a driving motor driven by the battery assembly is disposed at a front side of the vehicle.

In this case, there are problems in that a battery is damaged due to a vibration of the battery assembly coupled to the bottom surface of the vehicle during traveling of the vehicle, the vibration is transmitted to a vehicle body to degrade ride comfort, and noise is generated due to the vibration of the battery assembly.

The foregoing is intended merely to aid in understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a vehicle body with a battery connected thereto, which passes through a battery case, a lower panel, and a seat cross member in a vertical direction of the vehicle to integrally connect the battery case, the lower panel, and the seat cross member.

According to one aspect, there is provided a vehicle body with a battery connected thereto, which includes a lower panel of a vehicle which extends in a horizontal direction, and to which a battery case in which a battery is provided in an upper portion or a lower portion is coupled, a seat cross member configured to extend in a direction parallel to a transverse direction of the vehicle and located on an upper surface or a lower surface of the lower panel, a battery cross member provided in the battery case, configured to extend in the direction parallel to the transverse direction of the vehicle, and located to correspond to the seat cross member in a vertical direction of the vehicle, and a coupling device configured to simultaneously pass through to couple the lower panel, the seat cross member, and the battery cross member in the vertical direction of the vehicle.

The coupling device may include a battery pipe configured to pass through the battery cross member in the vertical direction of the vehicle, and a mounting bolt configured to pass through the battery pipe and connect the lower panel, the seat cross member, and the battery cross member.

The coupling device may further include a mounting cap coupled to an outer side of a battery at a position corresponding to the battery pipe and configured to support a head portion of the mounting bolt.

The battery case may be formed of a first case configured to surround the battery and a second case configured to surround the first case; and the mounting cap may partially overlap the second case on a plane where the first case and the second case are coupled and may be in contact with the second case to be coupled thereto.

The coupling device may further include a mounting nut coupled to the seat cross member at a portion in which the mounting bolt passes through the seat cross member and screw-coupled to the mounting bolt.

The seat cross member may be formed such that a first panel at an upper side and a second panel at a lower side are coupled, and the mounting nut may be coupled to a position where the first panel and the second panel are in contact with each other.

The mounting nut may be coupled to an intermediate portion of the position in which the first panel and the second panel are in contact with each other.

The seat cross member may be formed as a plurality of seat cross members in parallel with each other in a longitudinal direction of the vehicle.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Figure 1:
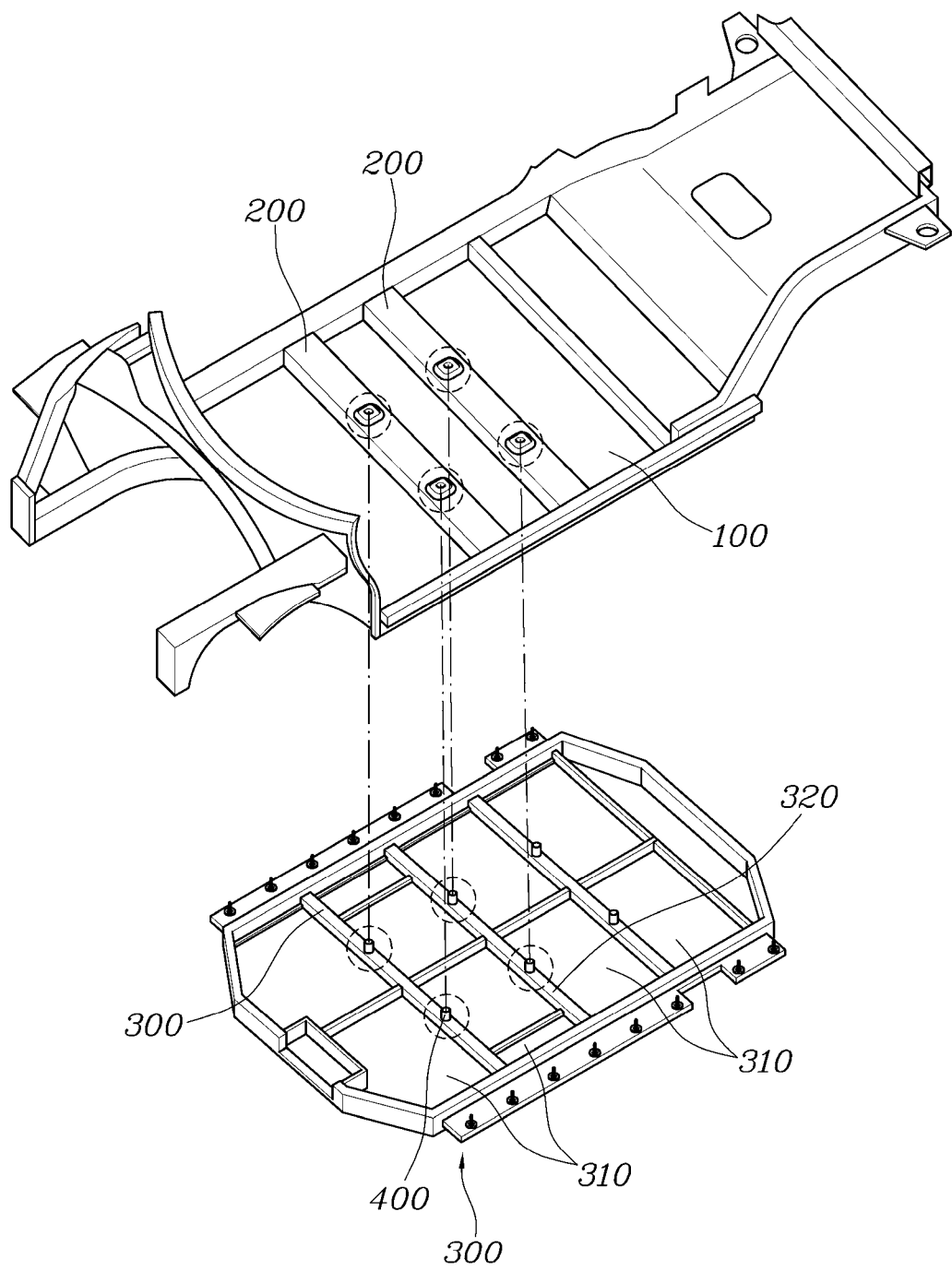
FIG. 1 is a perspective view illustrating a vehicle body to which a battery is connected according to an embodiment of the present disclosure.

Specific structural and functional descriptions of the embodiments of the present disclosure disclosed in this disclosure or application are illustrative only for the purpose of describing the embodiments according to the present disclosure, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another component, it should be understood that still another component may not be present between the component and another component. Other expressions describing the relationship between components, that is, "between" and "immediately between," or "adjacent to" and "directly adjacent to" should also be construed as described above.

Terms used herein are used only for the purpose of describing specific embodiments and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art and will not be interpreted as having an idealistic or excessively formalistic meaning unless clearly defined in this disclosure.

Hereinafter, exemplary embodiments of the present disclosure will be described in detail with reference to the accompanying drawings. Like reference numerals denote like members throughout the drawings.

Exemplary embodiments of a vehicle body on which a battery 310 is mounted according to the present disclosure will be described with reference to FIGS. 1 to 7.

The vehicle body to which the battery 310 is coupled according to the present disclosure is designed by improving a coupling device 400 for coupling the battery 310 to a vehicle body in a conventional vehicle body to which the battery 310 is coupled, and an objective thereof is to reduce noise, vibration, harshness (NVH) which are generated from a lower portion of the vehicle during traveling.

Figure 2:
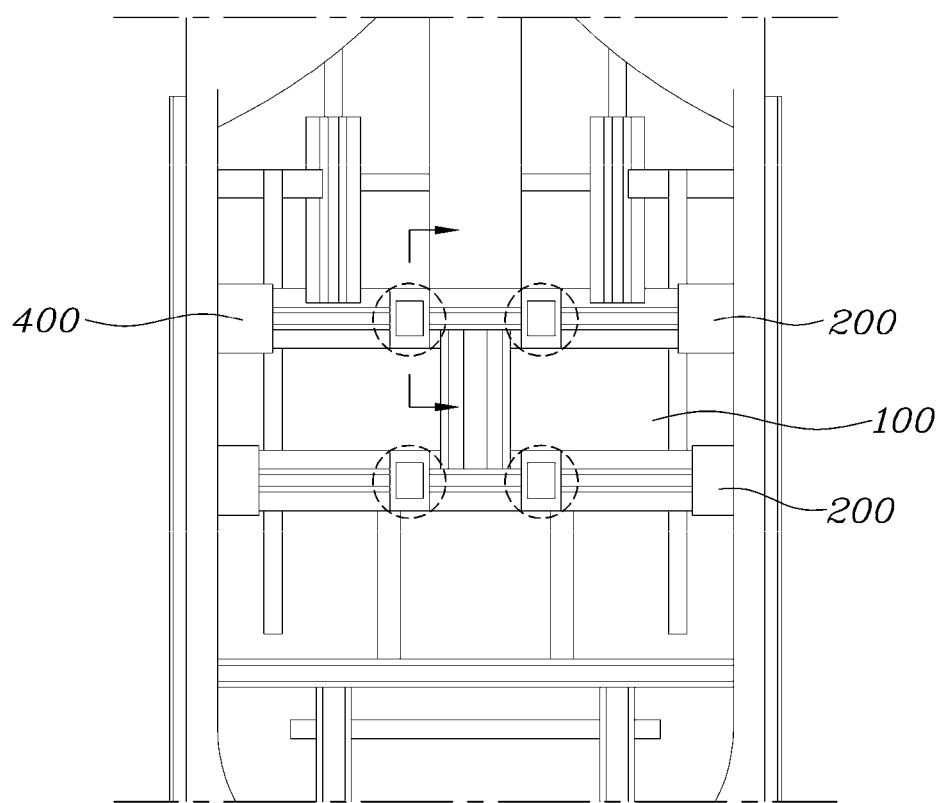
FIG. 2 is a plan view illustrating the vehicle body to which a battery is connected according to the embodiment of the present disclosure.
Figure 3:
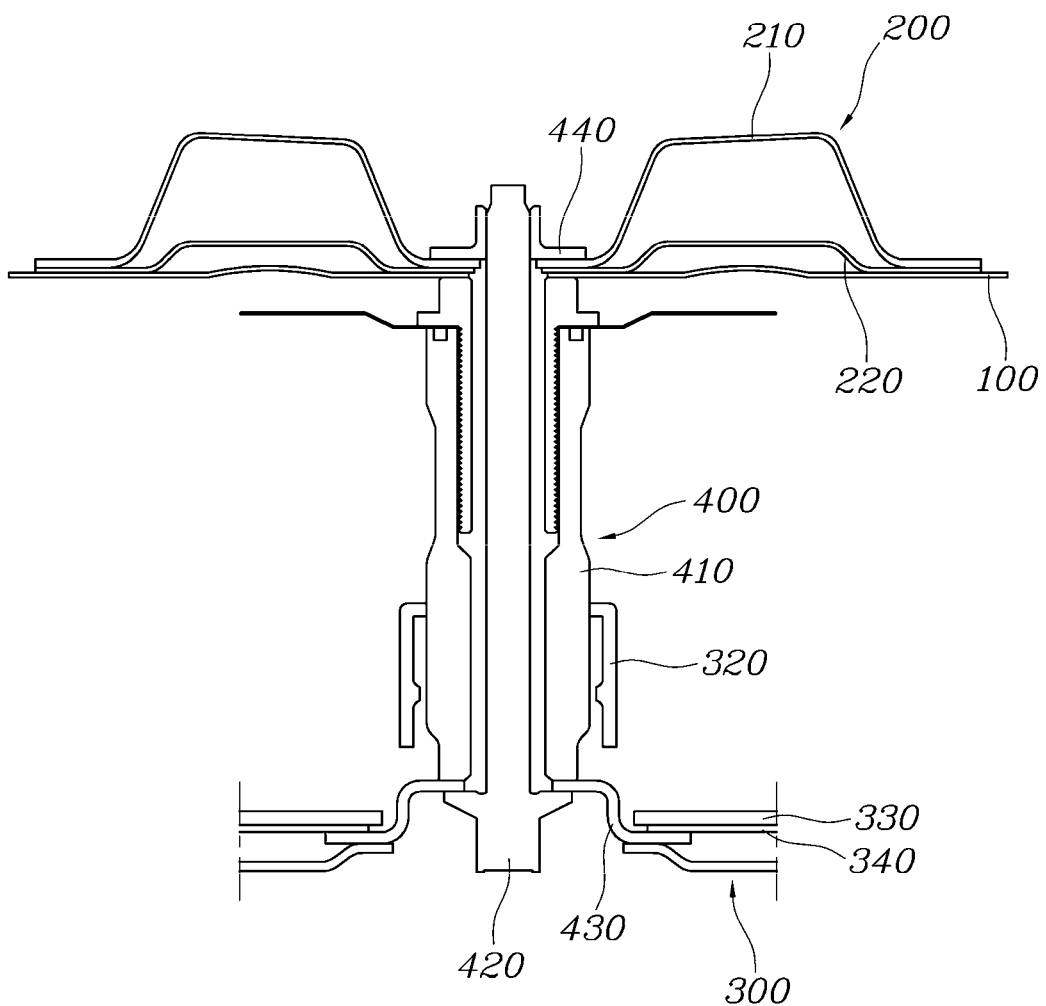
FIG. 3 is a cross-sectional view illustrating a coupling device in the vehicle body to which a battery is connected according to the embodiment of the present disclosure.
Figure 4:
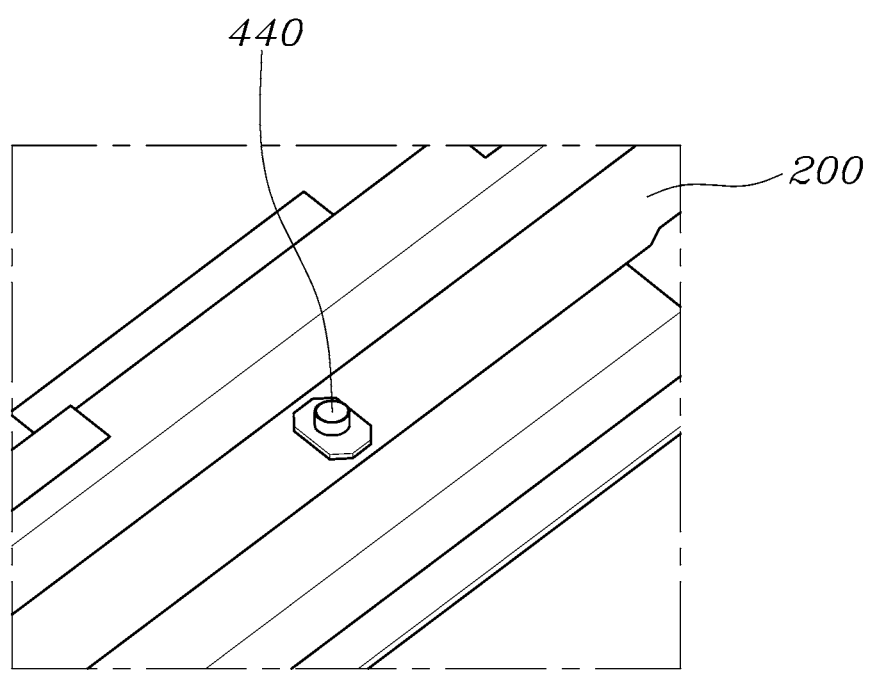
FIG. 4 is a perspective view illustrating a case in which a mounting nut is coupled to a seat cross member in the vehicle body to which a battery is connected according to the embodiment of the present disclosure.
Figure 5:
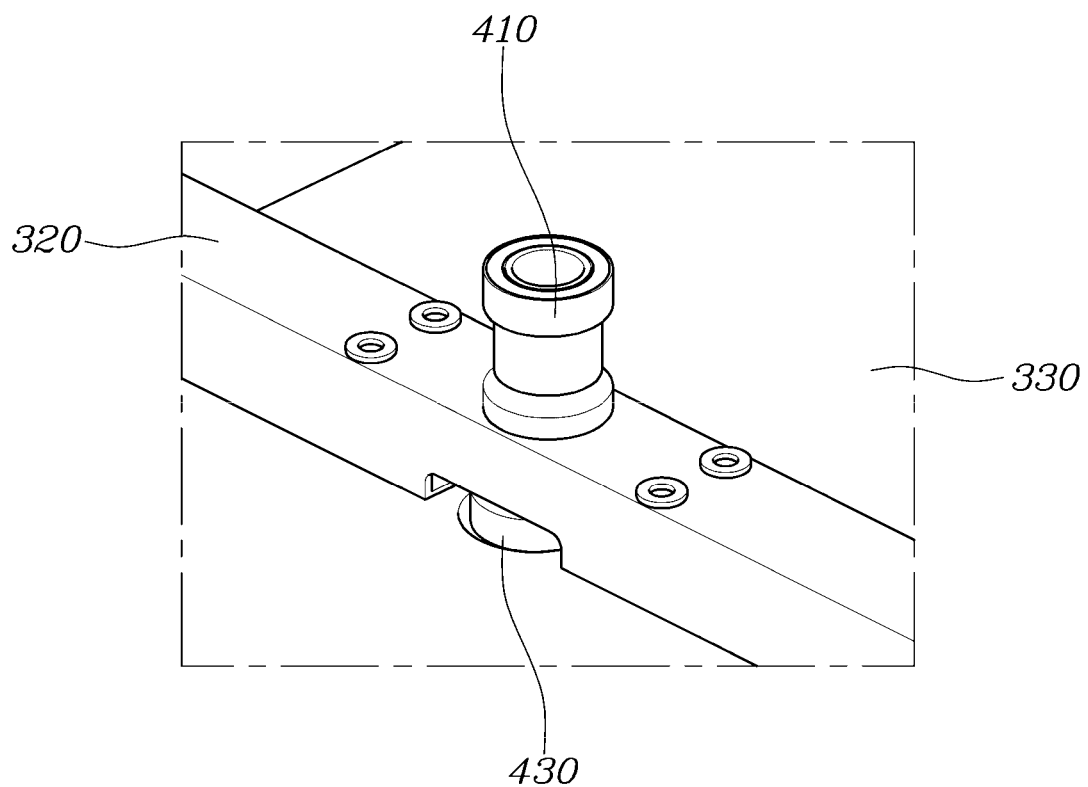
FIG. 5 is a perspective view illustrating a case in which a battery pipe passes through a battery cross member of the vehicle body to which a battery is connected according to the embodiment of the present disclosure.
Figure 6:
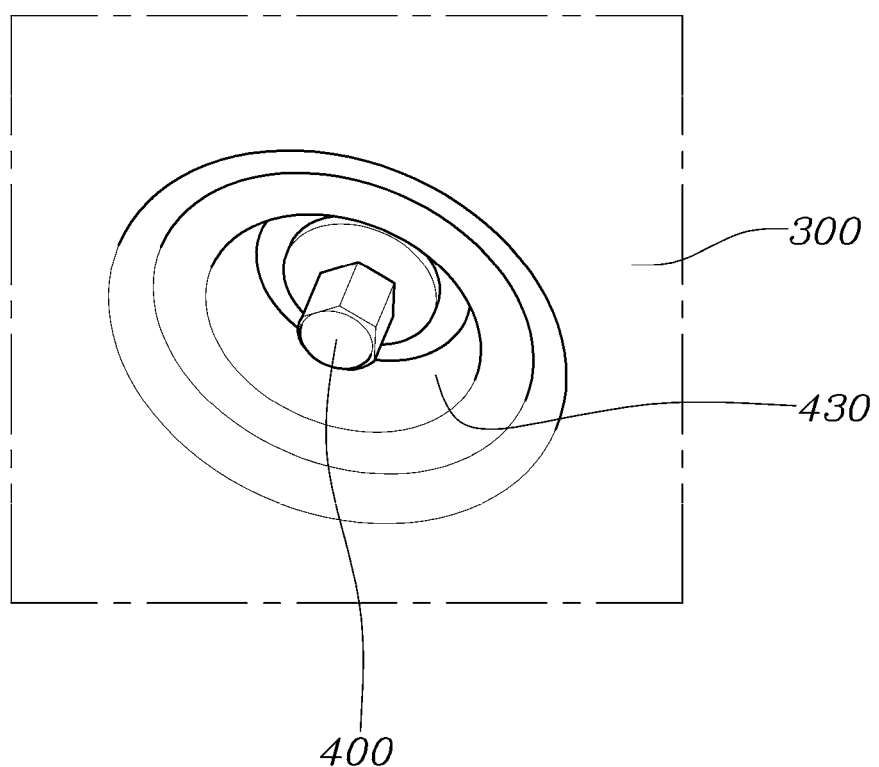
FIG. 6 is a perspective view illustrating a case in which a mounting bolt is coupled to a mounting cap of the vehicle body to which a battery is connected according to the embodiment of the present disclosure.
Figure 7:
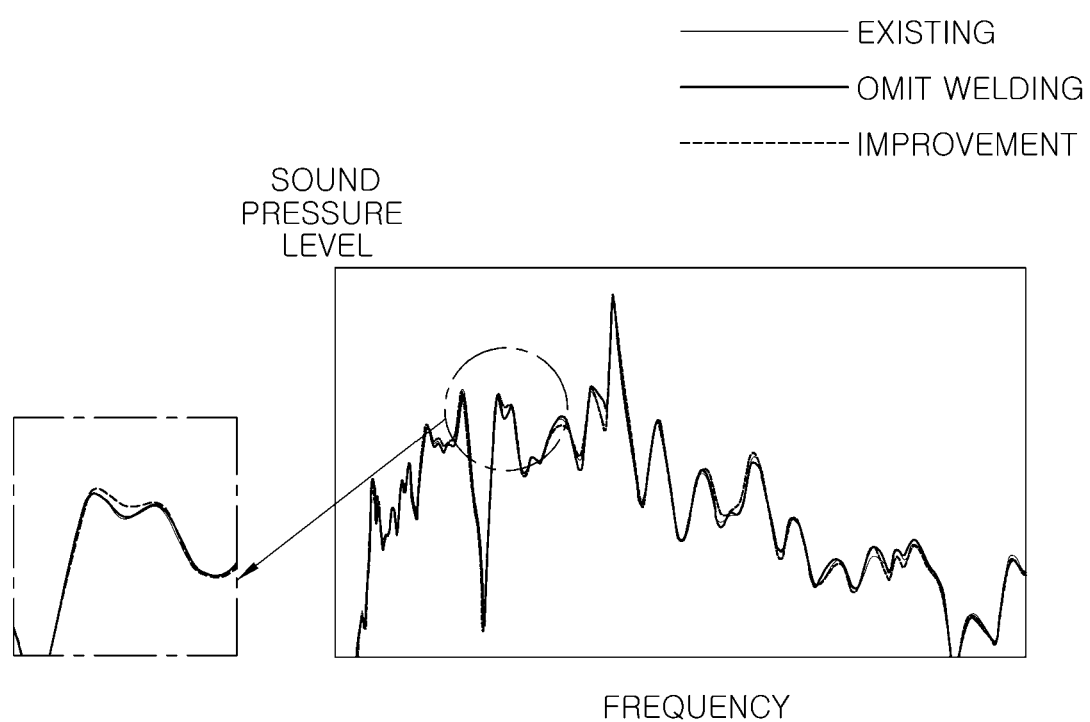
FIG. 7 is a graph showing a noise level versus frequency in a conventional vehicle body to which a battery is connected and the vehicle body with a battery connected thereto according to the embodiment of the present disclosure.

FIG. 1 is a perspective view illustrating a portion of vehicle body to which a battery 310 is connected according to an embodiment of the present disclosure, FIG. 2 is a plan view illustrating the vehicle body to which the battery 310 is connected according to the embodiment of the present disclosure, FIG. 3 is a cross-sectional view illustrating a coupling device 400 in the vehicle body to which the battery 310 is connected according to the embodiment of the present disclosure, FIG. 4 is a perspective view illustrating a case in which a mounting nut 440 is coupled to a seat cross member 200 in the vehicle body to which the battery 310 is connected according to the embodiment of the present disclosure, FIG. 5 is a perspective view illustrating a case in which a battery pipe 410 passes through a battery cross member 320 of the vehicle body to which the battery 310 is connected according to the embodiment of the present disclosure, FIG. 6 is a perspective view illustrating a case in which a mounting bolt 420 is coupled to a mounting cap 430 of the vehicle body to which the battery 310 is connected according to the embodiment of the present disclosure, and FIG. 7 is a graph showing a noise level versus frequency in a conventional vehicle body to which the battery 310 is connected and the vehicle body with the battery 310 connected thereto according to the embodiment of the present disclosure.

The vehicle body to which the battery 310 is coupled according to the present disclosure includes a lower panel 100 of a vehicle which extends in a horizontal direction, and to which a battery case 300 having the battery 310 provided in an upper portion or a lower portion thereof is coupled, a seat cross member 200 configured to extend in a direction parallel to a transverse direction of the vehicle, and located on an upper surface or a lower surface of the lower panel 100, a battery cross member 320 provided in the battery case 300, configured to extend in a direction parallel to the transverse direction of the vehicle, and positioned to correspond to the seat cross member 200 in a vertical direction of the vehicle, and a coupling device 400 configured to simultaneously pass through and couple the lower panel 100, the seat cross member 200, and the battery cross member 320 in the vertical direction of the vehicle.

The lower panel 100 may extend from a lower portion of the vehicle in a horizontal direction, and the battery case 300 in which the battery 310 is installed may be coupled to an upper surface or a lower surface of the lower panel 100.

As shown in FIGS. 1 to 3, in the vehicle body to which the battery 310 is coupled according to one embodiment of the present disclosure, the battery case 300 may be mounted on the lower surface of the lower panel 100, and the seat cross member 200 may be mounted on the upper surface of the lower panel 100.

The seat cross member 200 may extend in the transverse direction of the vehicle and may be mounted as a plurality of seat cross members, and a seat may be mounted above the seat cross member 200.

The battery cross member 320 may extend in the battery case 300 in the transverse direction of the vehicle, may be located to correspond to a position of the seat cross member 200 in the vertical direction, and may support the battery case 300 in the battery case 300 to improve rigidity of the battery case 300.

The coupling device 400 may pass through and couple the seat cross member 200, the lower panel 100, and the battery cross member 320 in the vertical direction.

Consequently, vibration or noise is reduced in the battery case 300, the lower panel 100, and the seat cross member 200 which are coupled to the lower portion of the vehicle.

The coupling device 400 includes a battery pipe 410 configured to pass through the battery cross member 320 in the vertical direction of the vehicle; and a mounting bolt 420 configured to pass through the battery pipe 410 and connect the lower panel 100, the seat cross member 200, and the battery cross member 320.

The battery pipe 410 may pass through the battery cross member 320, and the mounting bolt 420 may be inserted into the battery pipe 410 and may pass through the lower panel 100 and the seat cross member 200 to couple the battery case 300, the lower panel 100, and the seat cross member 200.

Consequently, a coupling force of the battery case 300, the lower panel 100, and the seat cross member 200 may be increased.

The battery pipe 410 of a conventional vehicle body to which the battery 310 is coupled is welded to the battery cross member 320, whereas the battery pipe 410 of the vehicle body to which the battery 310 is coupled according to the present disclosure may pass through the battery cross member 320 and may be coupled through the mounting bolt 420 instead of welding. As shown in the graph of FIG. 7, a difference in sound pressure level according to frequencies between the conventional vehicle body to which the battery 310 is coupled and in which the battery pipe 410 is welded to the battery cross member 320 and the vehicle body to which the battery 310 is coupled according to the present disclosure and in which welding is omitted is shown as insignificant so that a welding process may be omitted from the vehicle body to which the battery 310 is coupled according to the present disclosure.

Accordingly, the welding process may be omitted to simplify the manufacturing process.

The coupling device 400 further includes a mounting cap 430 coupled to an outer side of the battery 310 at a position corresponding to the battery pipe 410 and configured to support a head portion of the mounting bolt 420.

As shown in FIGS. 3 and 6, the mounting cap 430 coupled to the battery case 300 may be coupled to a lower side of the battery pipe 410, and the head portion of the mounting bolt 420 inserted into the battery pipe 410 may be supported on the mounting cap 430.

Consequently, the coupling force of the battery case 300, the lower panel 100, and the seat cross member 200 may be increased.

In addition, when compared with the mounting cap 430 of the conventional vehicle body to which the battery 310 is coupled, a diameter of the mounting cap 430 of the vehicle body to which the battery 310 is coupled according to one embodiment of the present disclosure is increased so that there is an effect of increasing coupling rigidity between the mounting bolt 420 and the battery case 300.

The battery case 300 is formed of a first case 330 for surrounding the battery 310 and a second case 340 for surrounding the first case 330, and the mounting cap 430 partially overlaps a plane on which the first case 330 and the second case 340 are coupled and is in contact with the second case 340 to be coupled thereto.

As shown in FIG. 3, the battery case 300 may be formed of the first case 330 for surrounding the battery 310 and the second case 340 for surrounding the first case 330, and the mounting cap 430 may be coupled such that an end portion of the mounting cap 430 partially overlaps an overlapping portion of the first case 330 and the second case 340 in a direction of a plane on which the first case 330 and the second case 340 extend.

Consequently, a coupling force between the mounting cap 430 and the battery case 300 which are coupled through the mounting bolt 420 may be increased.

The coupling device 400 further includes a mounting nut 440 coupled to the seat cross member 200 at a portion in which the mounting bolt 420 passes through the seat cross member 200 and screw-coupled to the mounting bolt 420.

As shown in FIGS. 3 and 4, the mounting nut 440 is fixedly coupled to an upper surface of the portion in which the mounting bolt 420 passes through the seat cross member 200, and the mounting bolt 420 and the mounting nut 440 may be screw-coupled.

Consequently, the coupling device 400 may couple the battery case 300, the lower panel 100, and the seat cross member 200.

The mounting nut 440 may be fixedly coupled to the seat cross member 200 by welding, for example.

The seat cross member 200 is formed such that a first panel 210 at an upper side and a second panel 220 at a lower side are coupled, and the mounting nut 440 is coupled at a position where the first panel 210 and the second panel 220 are in contact with each other.

The seat cross member 200 may be formed of the first panel 210 located at the upper side and the first panel 210 located at the lower side, predetermined portions of the first panel 210 and the second panel 220 may be coupled to form a space therebetween, and the mounting nut 440 may be coupled to a portion in which the first panel 210 and the second panel 220 are coupled, and the mounting nut 440 may pass through the portion in which the first panel 210 and the second panel 220 are coupled to the mounting nut 440.

Consequently, a length of the mounting bolt 420 may be reduced, and, as the mounting bolt 420 and the mounting nut 440 are coupled in the portion in which the first panel 210 and the second panel 220 are in contact with each other, rigidity by which the seat cross member 200 is coupled to the lower panel 100 may be increased.

The mounting nut 440 is coupled to an intermediate portion of the position where the first panel 210 and the second panel 220 are in contact with each other.

The mounting nut 440 may be provided as a plurality of mounting nuts in an intermediate portion of the seat cross member 200 in the position where the first panel 210 and the second panel 220 are in contact with each other and coupled to each other to be coupled through the mounting bolt 420.

Consequently, when the seat cross member 200 is coupled to the lower panel 100 and the battery case 300, an engagement load of the mounting bolt 420 is transmitted to an entirety of the seat cross member 200 so that there is an effect of increasing engagement rigidity.

The seat cross member 200 is formed as a plurality of seat cross members in parallel with each other in a longitudinal direction of the vehicle.

A plurality of seat cross members 200 may be coupled to the upper surface of the lower panel 100 to support a lower portion of the vehicle or coupled to the lower panel 100 according to a seat of the vehicle, which is formed in one row, two rows, or three rows.

Consequently, rigidity of the vehicle is increased in the transverse direction.

In accordance with a vehicle body to which a battery is connected according to the present disclosure, a coupling device passes through to integrally connect a battery case, a lower panel, and a seat cross member in a vertical direction of a vehicle so that there is an effect that is capable of reducing a vibration and noise which are generated from a lower portion of the vehicle during traveling.

In addition, the battery pipe of the coupling device may be inserted into the battery cross member to be coupled thereto through bolting instead of welding. In accordance with the coupling device of the present disclosure, a manufacturing process may be reduced compared to that of the conventional coupling device in a state of maintaining a noise level versus vibration that is similar to that of the conventional coupling device.

Although the specific embodiments of the present disclosure have been described and illustrated, those skilled in the art will appreciate that various alternations and modifications are possible without departing from the technical spirit of the present disclosure provided in the appended claims.

The invention claimed is:

1. A vehicle body with a battery connected thereto, comprising:
    a lower panel of a vehicle which extends in a horizontal direction;
    a battery case coupled to the lower panel, the battery case having a battery provided in a lower portion or an upper portion of the battery case;
    a seat cross member configured to extend in a direction parallel to a transverse direction of the vehicle, the seat cross member being located on an upper surface or a lower surface of the lower panel;
    a battery cross member provided in the battery case, the battery cross member being configured to extend parallel to the transverse direction of the vehicle, and positioned to correspond to the seat cross member in a vertical direction of the vehicle; and
    a coupling device configured to pass through and secure the lower panel, the seat cross member, and the battery cross member in the vertical direction of the vehicle.

2. The vehicle body of claim 1, wherein the coupling device includes:
    a battery pipe configured to pass through the battery cross member in the vertical direction of the vehicle; and
    a mounting bolt configured to pass through the battery pipe and connect the lower panel, the seat cross member, and the battery cross member.

3. The vehicle body of claim 2, wherein the coupling device further includes a mounting cap coupled to an outer side of a battery at a position corresponding to the battery pipe and configured to support a head portion of the mounting bolt.

4. The vehicle body of claim 3, wherein:
    the battery case includes a first case configured to surround the battery and a second case configured to surround the first case; and
    the mounting cap partially overlaps the second case on a plane where the first case and the second case are coupled, and is in contact with the second case to be coupled thereto.

5. The vehicle body of claim 2, wherein the coupling device further includes a mounting nut coupled to the seat cross member at a portion in which the mounting bolt passes through the seat cross member and screw-coupled to the mounting bolt.

6. The vehicle body of claim 5, wherein:
    the seat cross member is formed such that a first panel at an upper side and a second panel at a lower side are coupled; and
    the mounting nut is coupled to a position where the first panel and the second panel are in contact with each other.

7. The vehicle body of claim 5, wherein the mounting nut is coupled to an intermediate portion of the position in which the first panel and the second panel are in contact with each other.

8. The vehicle body of claim 1, wherein the seat cross member is formed as a plurality of seat cross members in parallel with each other in a longitudinal direction of the vehicle.

* * * * *